Dec. 28, 1965    A. A. THOMPSON    3,226,535
PHASE DIFFERENCE MEANS FOR SEISMIC STUDIES
Filed Dec. 13, 1961                           6 Sheets-Sheet 1

INVENTOR.
Andrew A. Thompson
BY
S. J. Rotondi & A. J. Dupont

Dec. 28, 1965  A. A. THOMPSON  3,226,535
PHASE DIFFERENCE MEANS FOR SEISMIC STUDIES
Filed Dec. 13, 1961  6 Sheets-Sheet 2
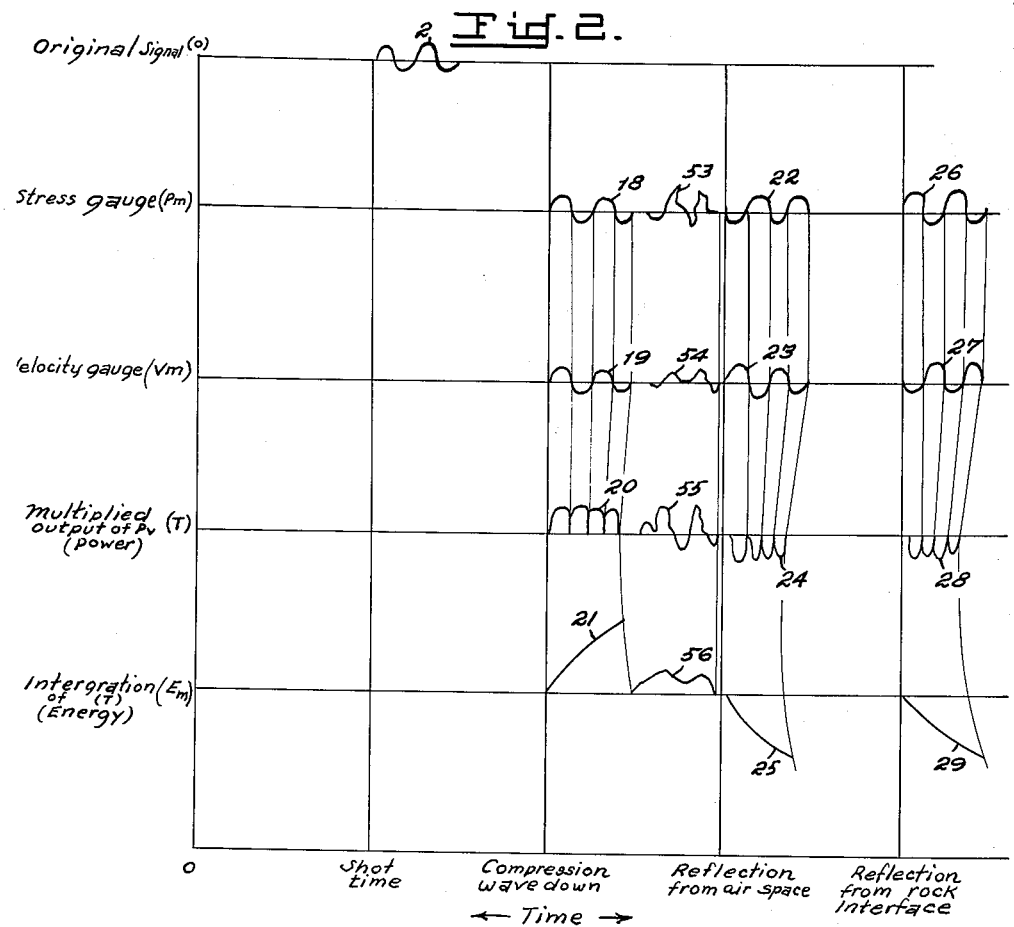
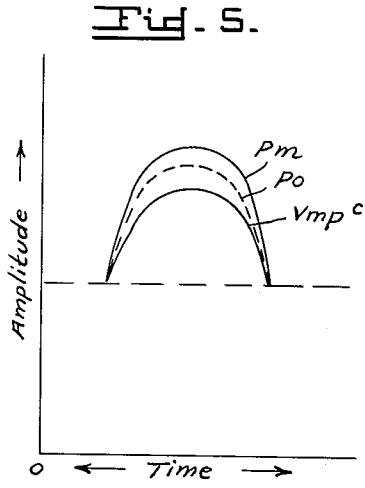
INVENTOR.
Andrew A. Thompson
BY
S.J. Rotondi & A. J. Dupont Dec. 28, 1965      A. A. THOMPSON      3,226,535
PHASE DIFFERENCE MEANS FOR SEISMIC STUDIES
Filed Dec. 13, 1961      6 Sheets-Sheet 3
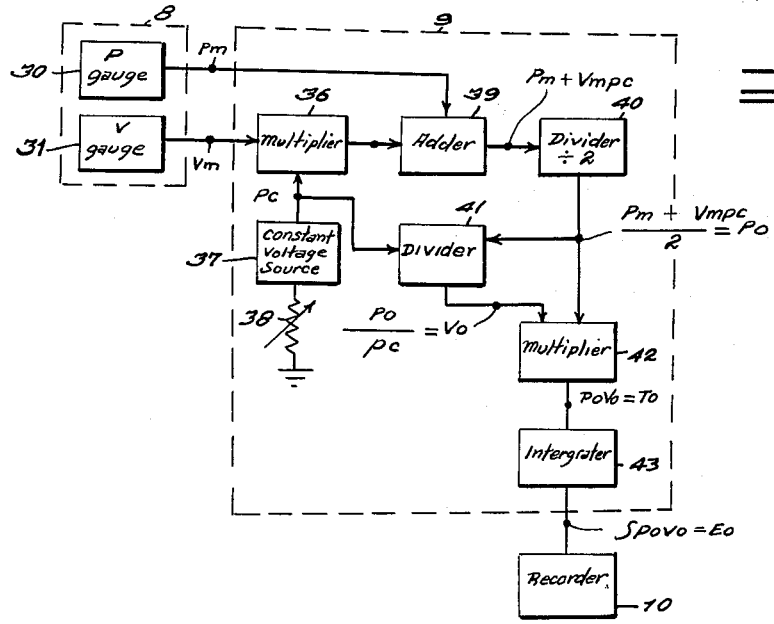
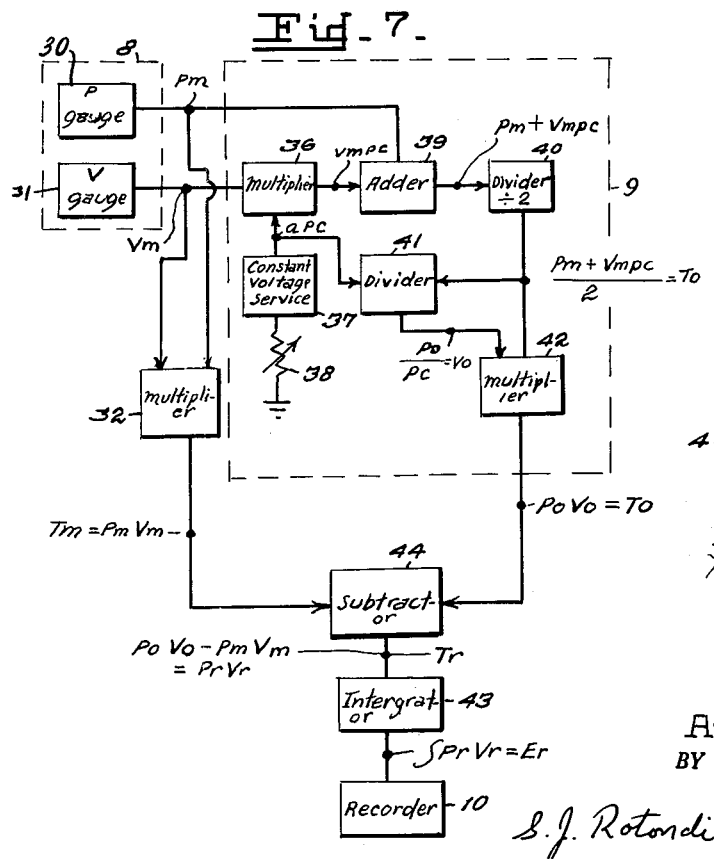
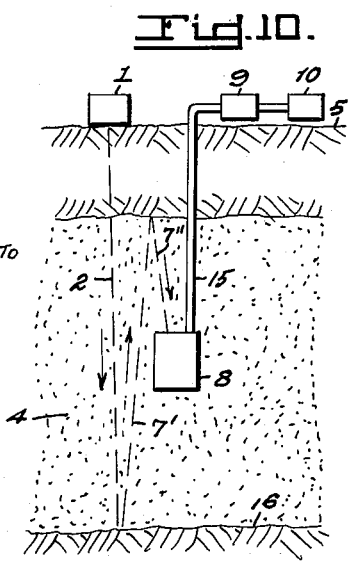
INVENTOR.
Andrew A. Thompson
BY
S. J. Rotondi & A. J. Dupont Dec. 28, 1965  A. A. THOMPSON  3,226,535
PHASE DIFFERENCE MEANS FOR SEISMIC STUDIES
Filed Dec. 13, 1961  6 Sheets-Sheet 4
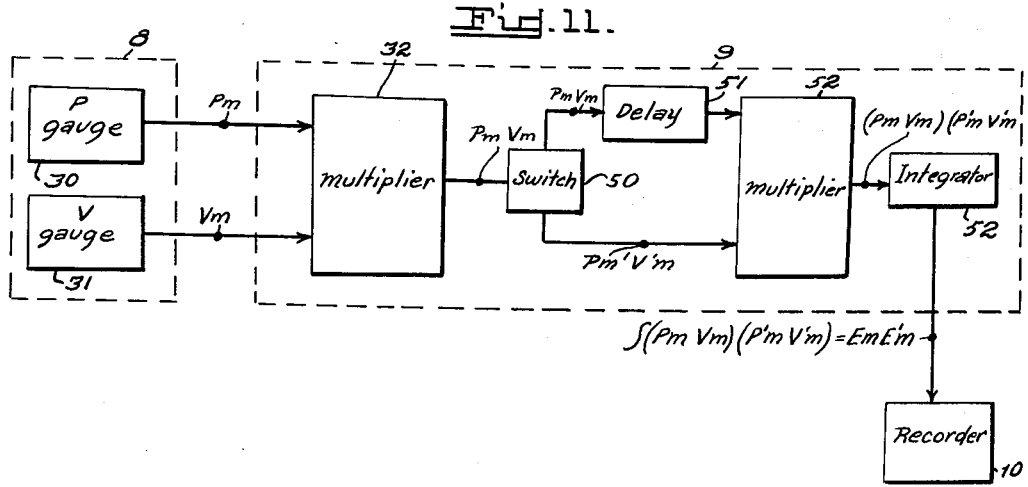
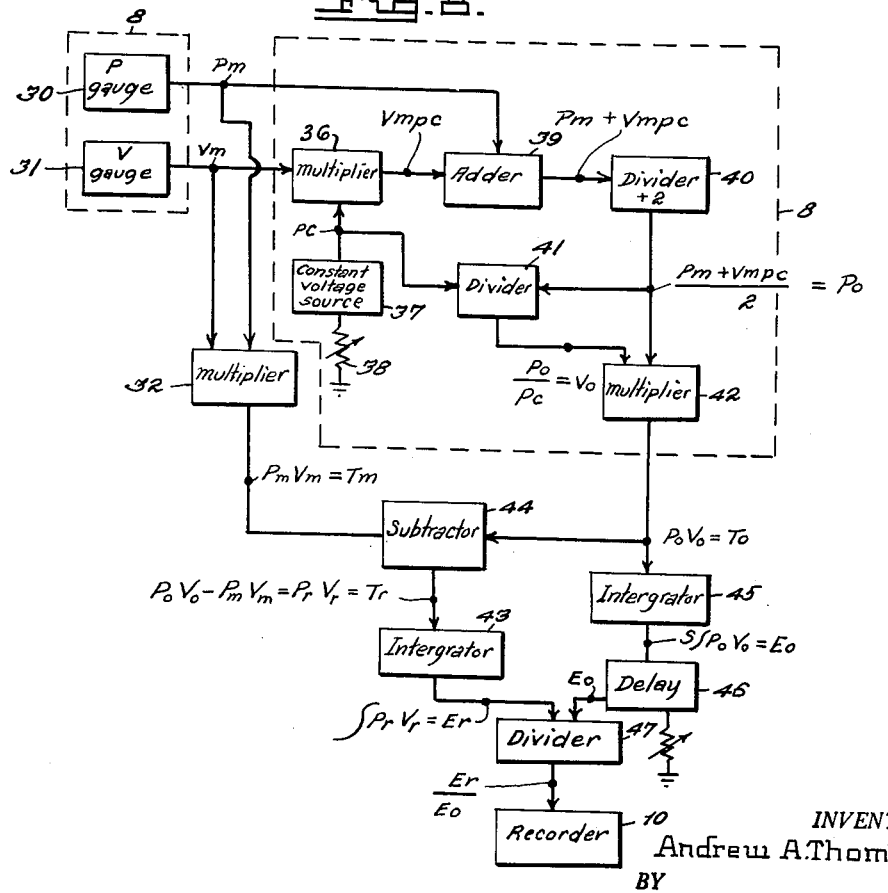
INVENTOR.
Andrew A. Thompson
BY
S. J. Rotondi & A. J. Dupont

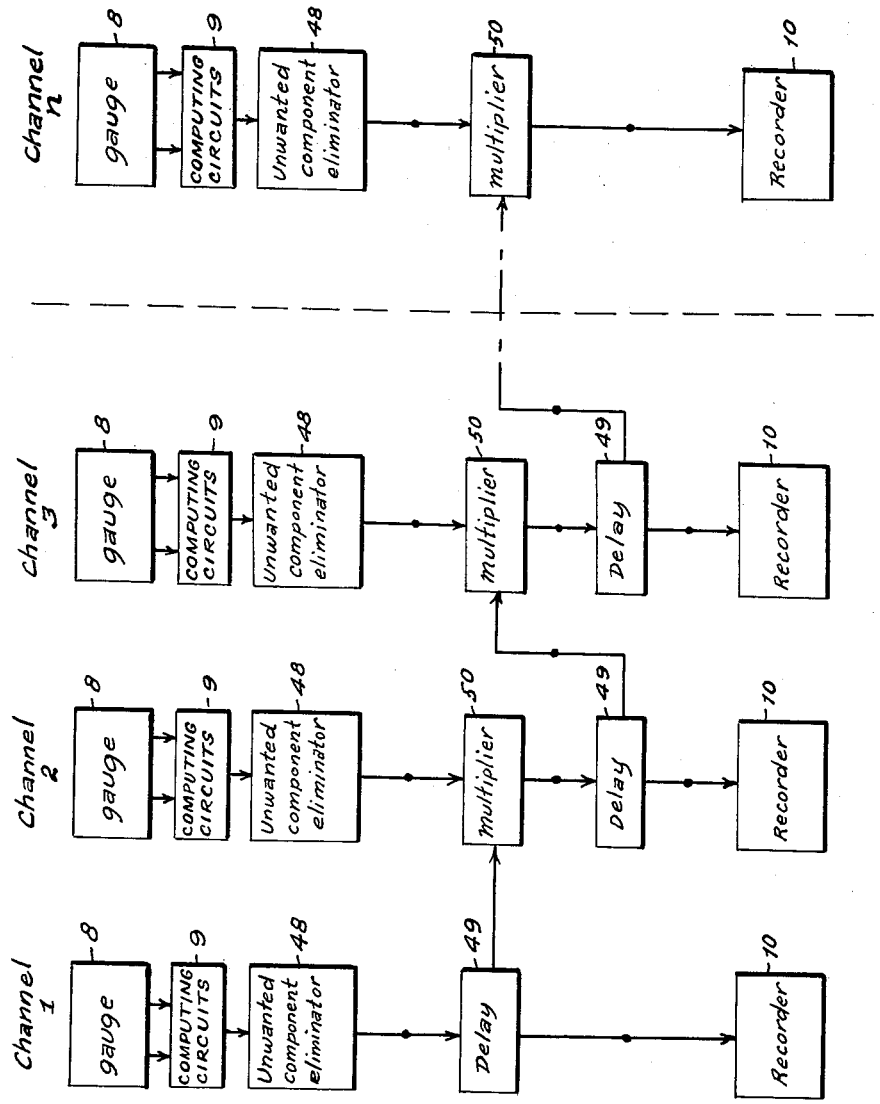

United States Patent Office 3,226,535
Patented Dec. 28, 1965

3,226,535
PHASE DIFFERENCE MEANS FOR SEISMIC STUDIES
Andrew A. Thompson, Mt. Felix, Star Rte.,
Havre de Grace, Md.
Filed Dec. 13, 1961, Ser. No. 159,189
5 Claims. (Cl. 235—193)
(Granted under Title 35, U.S. Code (1952), sec. 266)

The invention described herein may be manufactured and used by or for the Government for governmental purposes without the payment to me of any royalty thereon.

This invention relates to surveying and other related fields and is directed particularly to a phase method and apparatus for improving the signal-to-noise ratio of surveying systems.

Various known surveying systems work upon the principle of recording the direction from and/or time and amount of a signal reflected by or received from a given surface or object. Among the commonly known systems utilizing such a principle are seismic geophysical surveying systems, sonar type systems, and air surveying or listening systems. However, all these systems have certain disadvantages that are not readily overcome using presently known pick-up and recording systems. Some of the most notable of these disadvantages is the poor signal-to-noise ratio inherent with these presently existing systems which can not adequately measure and record energy coming only from a chosen direction. Another disadvantage is the limited ability of these known methods to adequately give only arrival times, and not quantitative information on the signal such as reflection coefficients. Such quantitative information if obtainable for seismic prospecting for oil, would allow the location of stratographic traps through the seismic technique. Various ones of these systems and there operations will be given for purposes of clarity.

One of the general methods, commonly employed in the seismic reflection or refraction method for sub-surface explosions for oil or other mineral deposits, is that known as seismic prospecting wherein a seismic distrubance is initiated at some selected point or points in or on the earth's surface as, for example, by detonating an explosive charge in a shot hole, which causes seismic waves to travel through the earth and to be reflected back from sub-strata formations to various pick-up and recording devices located on or near the surface of the earth. These reflected waves are usually detected at a number of points by a plurality of identical pickup elements which are all responsive to the same type signal generated by the seismic disturbance. These pickup elements, which may be called seismometers, geophones or seismic detectors, are usually arranged so that the reflected seismic wave will be easily detected and recorded. Often a group of detectors for each channel are arranged in a predetermined pattern so that the reflected seismic wave is relatively strengthened and thus the signal to noise ratio is increased. The output signal from the pickup elements, which are usually in the form of varying electrical signals, may be recorded on a suitable recording means such as, for example, photographic paper or a tape which has suitable time marks. From this recording information, and like data obtained in a similar manner, it is possible to estimate with some degree of accuracy the depth and structure of the various substrata formations under investigation. Thus it may be seen that the reliability and the amount of information that can be gained from a seismic map depends on how well a system can pick out a reflection from the background noise, or the ability of the system to increase the signal-to-noise ratio to a figure sufficient to detect the reflection. Filtering, mixing, cross correlation, and pattern shooting are often used to increase this ratio. Furthermore it may be seen that the general method, above described, gives the arrival time of the reflection that can be detected so as to map sub-surface structure or depths of a discontinuity. In order to map stratigraphy or type of a deep discontinuity, it may be seen that one must be able to quantitatively determine the energy arriving in any predetermined direction from place to place.

Another well known disadvantage of presently existing seismic systems is found in the methods used to create seismic waves in the earth. It is well known that these existing methods for creating seismic waves inherently create high intensity horizontally propagating surface waves that interfere with the detection and recording of the vertically travelling reflected seismic waves. At present there is no known way to completely prevent the creation of these horizontal waves when the necessary and desired vertical waves are created. It thus becomes apparent that a method and system that distinguishes undesired horizontally propagating waves from the desired vertically travelling reflected waves and eliminates these horizontal waves before they are recorded is highly desirable.

The successful use of sonar type systems for detecting underwater objects, such submarines, depend upon the ability of the system to detect and separate the signals produced by the object from the undesired background noise commonly present. It is readily seen that if the background noise is stronger than the signal being produced by the object, the signal being produced by the object will go undetected. Thus, it becomes highly desirable to have a pickup and recording system that will separate a desired signal from background noises that are higher in amplitude than the signal. The use of such a system would permit the detection of the underwater object even though the object be surrounded by noise generating mediums. With such a system, underwater objects which produce some given signal could be readily located regardless of the amount of noise normally masking the generated signal.

Air surveying or listening systems are finding increased use in determining if, for example, an explosion has occured in the air and the possible effect that the explosion will have upon certain objects located at or near the surface of the earth. The systems work upon the principle of recorded sound waves which may either hit the pickup directly or be reflected from some object to the pickup device. Again, the present systems now in use depend upon the desired filtered signal being higher in amplitude than the filtered background noise also being received. If the desired signal is not as strong as the background noise, it will be masked or hidden by this noise and thus will go undetected. Furthermore the present systems cannot easily quantitatively determine energy traveling in any predetermined direction.

Although it is theoretically possible to detect the reflected waves or disturbances by the use of a single pickup or detecting device, in practice it is usually impossible to pick out indicated waves from a number of other undesired and unrelated noises or vibrations that are detected and recorded at the same time as the desired wave. Therefore, in presently existing systems, it is usually necessary to employ a plurality of pickup or recording devices spread over a considerable distance along the sound transmitting surface or medium in a selected pattern, and to make a plurality of traces in side-by-side relation on a single chart for purposes of comparison. These traces are used since a reflection from a well define reflector will appear on the record as a wave form of increased amplitude on all of the traces in some definite time relation, thus permitting the reflection to be "lined up" on the record.

However, under certain conditions, even the elaborate use of a plurality of pickup or detecting elements arranged in a preset pattern does not give the desired detection of the signal or reflected wave. When difficulties of this nature are encountered in obtaining suitable reflections on the record, significant improvements in the ratio of usable to spurious signals or, in other words, in the ratio of reflection to non-reflection energy, can often be obtained by using a plurality of pickup or detecting elements. Each of these elements is responsive to the same reflected signal parameter and depends on the fact that all the elements are tied to one trace on the record for an improvement in the signal-to-noise ratio. Some improvement may also be obtained by using greater surface coverage or "spreading out" of the geophones connected to each trace.

All of the above described methods and systems for improving the signal-to-noise ratio over that obtained by using a single pickup or detecting device are expensive and sometimes undesirable because of the great number of pickup elements and related circuitry that is necessary. Also the excessive time required to arrive at, and set the pickups in a predetermined pattern often becomes excessive and the results obtained are not adequate.

Accordingly, it is an object of the present invention to furnish a method and system arrangement whereby the desirable effect of an increase in the signal-to-noise ratio may be obtained.

Another object of this invention is to provide a method for quantitatively determining the energy propagating only in any predetermined direction even though the energy, traveling in, for example, opposite directions, is picked up and recorded simultaneously. Such quantitative measurements are necessary in for example, attenuation determinations.

Another object of this invention is to provide a method for quantitatively determining the power or energy incident, transmitted through, and reflected from any discontinuity, even though the measurements may be taken at only one location.

Another objective of the invention is to provide a simpler method for determining the direction of travel of maximum energy that is propagating.

Another object of this invention is to provide a method for picking up and recording a desired signal but eliminating other undesired signals or noises.

Still another object of this invention is to provide a method and system for detecting objects with a higher degree of accuracy and at a greater distance than heretofore obtainable.

Yet another object of the present invention is to provide a surveying system that is cheaper to construct and simpler to operate than presently existing systems.

A still further object of this invention is to provide a system for use in surveying that will give a high signal-to-noise ratio without requiring that a pattern or plurality of pickup elements be used.

Yet another object of this invention is to provide a system that will pick up and record a desired reflected seismic signal but will eliminate other undesired signals or noises.

Yet a further object of this invention is to provide a pickup and recording system that will detect and locate underwater signals producing objects even though the signal being produced is lower in amplitude than the surrounding underwater noises.

Still another object of this invention is to provide a method and system for picking up and recording desired signals which are transmitted through a gaseous medium.

Another object of this invention is to provide a method and system to find the best frequency for maximum reflection (or best energy return) in the mapping of any discontinuity if a vibrator that can generate various frequencies, is available. Furthermore, once the desired frequency has been determined, it is the object to have a system for getting the best efficiency of the controlled generating source.

Another object is to determine whether the effective acoustic impedance is increasing or decreasing and also means to determine the effective change (amount and polarity) in impedance with frequency.

The above mentioned objectives are accomplished by the picking up or detecting of two different types of vector signals or parameters which are present in all waves transmitted through a medium under test. When the product of the signals, picked up, are multiplied and integrated, with respect to time, the continuous desired signals will add up while the undesired signals or noises, which are random in occurrence and are propagated in various directions through the test medium, will cancel out. The nature and objects of the invention and the manner in which it is utilized will be more clearly appreciated from the ensuing description, particularly when taken in conjunction with the accompanying drawing in which:

FIGURE 2 is a graph showing various wave forms that appear at various points throughout the surveying system shown in FIGURE 1 where the fine lines running nearly vertical, indicate constant time;

FIGURE 5 is a graph representation of the measured parameters in like units appearing in the system of FIG. 6;

Figure 12:
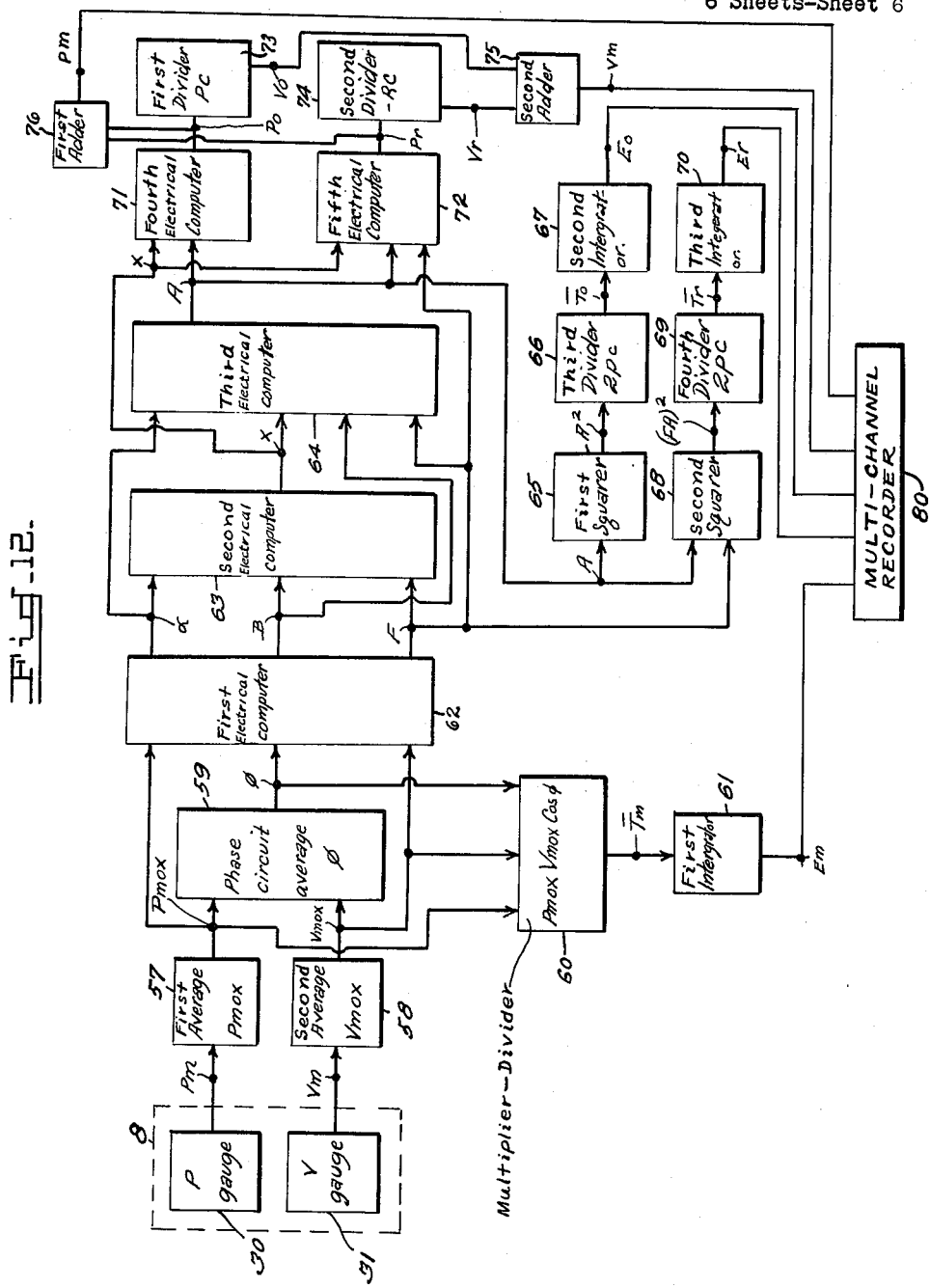

FIGURE 6 is a block diagram of a surveying system used to determine the original (or incident) energy (or power) contained in a propagating wave if no reflecting discontinuity were at or ahead (in the direction of propagation chosen) of the position of measurement, or the system in FIG. 6 could be used to determine only the energy or power propagating in a chosen direction with energy that is propagating in the opposite or other direction removed;

FIGURE 7 shows a surveying system in block form for determining the amount of reflected energy received by the system, this reflected energy being reflected and thus returning from any discontinuities (changes of acoustic impedance of the ground, water, or air medium) at or ahead of the position of measurement;

FIGURE 8 shows a surveying system in block form for determining the reflected to incident (original) energy ratio or reflection coefficient of any discontinuities which exhibit a change in acoustic impedance and causes a reflected wave to occur. (This reflection coefficient can change with wave frequency depending on type of discontinuity. Such information is needed for example in seismic oil prospecting for stratographic traps);

FIGURE 9 is a block diagram of a surveying system constructed in accordance with this invention in which the outputs of a plurality of individual channels are multiplied together for a higher signal-to-noise ratio;

FIGURE 10 is a cross section view of a pickup element buried a predetermined distance in the earth's surface so that the wave reflected down from the surface may be utilized to give an increased signal-to-noise ratio;

FIGURE 11 is a block diagram of the electrical circuit portion of the recording system used in connection with FIG. 10; and FIGURE 12 is a system in which the sinusoidal peak (for the frequency desired) of the stress ($P_m$) and particle velocity ($V_m$) and the phase difference between this sinusoidal stress and particle velocity are used in a surveying system.

For purposes of clarity, the function and operation of the phase method system will be explained in relationship to a seismic reflection or refraction method for subsurface explosions although the same system and method can be used equally well in a water or air medium. Although it is well known that a seismic wave can be a complex wave comprising various body and surface waves, for purposes of clarity it will be considered as consisting of only the compressional wave. Thus, for purposes of this invention, the seismic wave will be considered the same as a compressional wave and may be defined as a wave having its particle motion in the direction of wave propagation.

Figure 1:
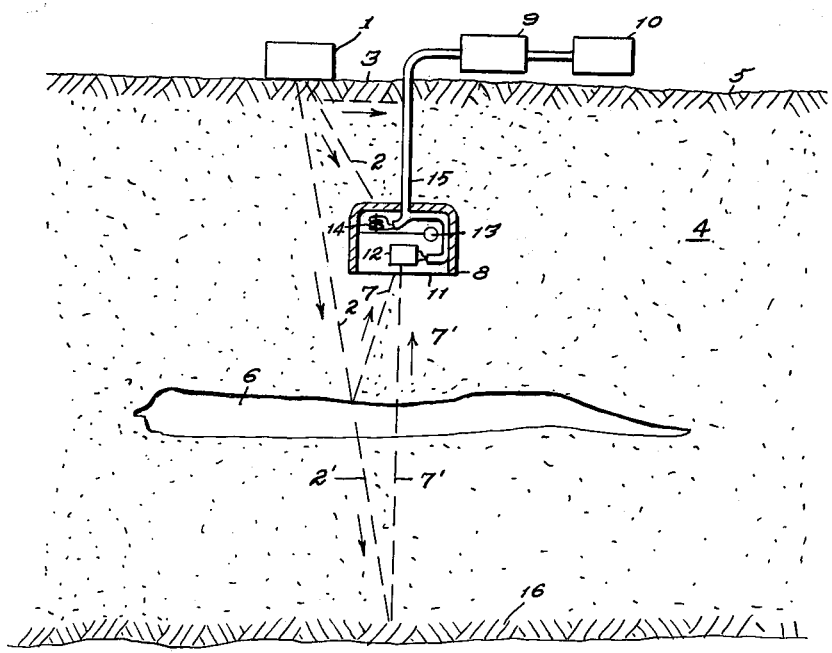
FIGURE 1 is a cross section view of a surveying system buried in the earth.

It should be noted that a medium that is traversed by any propagating wave can be instrumented to measure either the forces or the motions associated with the propagating wave. The (particle) motion in this invention is usually referred to as particle velocity, however, acceleration or displacement is also the motion measurement. The forces in this invention are usually referred to as stress, however pressure is also the force measurement. Various type gages are presently available that will measure both the force (stress or pressure) and the motion (acceleration, velocity, or displacement) associated with the propagating wave. By way of example, two such gages are shown in FIG. 1 which will respond to these two different parameters created by the single compression wave.

In referring to FIG. 1, there is shown, located near (or on providing the detrimental effect of the surface which can be eliminated as indicated below in FIG. 6) the surface of the earth 5 a source of seismic waves or disturbances 1 which may be of the hydraulic, mechanical or explosive type depending on which is more desirable. The disturbance created by the source 1 produces a plurality of various seismic waves which are generally indicated by the dotted lines 2 and 3. The seismic wave 2 is shown as being the downward directed compression wave while seismic wave 3 is shown as a horizontally propagating surface wave 3 which is inherently produced by the source 1. The compression wave 2 which is created by source 1 will first pass a buried pickup element 8 in a downward direction. The element 8 is constructed of a flexible diaphragm 11 connected to a responsive unit such as, for example, crystal or strain gage 12. This unit will produce an electrical signal as the diaphragm 11 is moved by the vertical stress forces of the seismic waves acting through the subterranean strata 4. Also located within the element 8 is a second pickup unit consisting of a velocity gage or accelerometer made up in part of a weighted or pendulum-like arm 13 suspended in a freely movable position to the casing of the element 8. Connected to the arm is a motion responsive device 14 such as, for example, a variable reluctance gage. The arm is located in a horizontal direction so that it will be responsive to any vertical motion of the element 8 caused by the vertical particle movement of the subterranean strata 4 surrounding the element when the downward directed compression waves strike the gage. Both the unit 12 and the responsive device 14 are connected to the circuits 9 and 10 by an electrical conductor 15. It should be realized that the construction of element 8 is exemplary only and is not restricted to that shown but may be of any type that will measure both the stress forces and vertical motion created by the seismic waves.

It should be noted that, as the downward directed compression wave 2 travels through the subterranean strata 4, two various types of reflections may occur (of course a complicated infinite combination of the two reflection types are the usual encounter with the more complicated discontinuities). The first type reflection 7 occurs when the downward directed seismic wave 2 strikes a decrease in acoustic impedance of the medium such as shown by the air pocket or void 6. The second type of reflection occurs when the part of wave 2, which is transmitted through the area 6, strikes an increase in the acoustic impedance such as shown by the rock interface 16. Of course, if no change in acoustic impedance is present in the medium under test, there will be no reflection. The way in which these changes in acoustic impedance are detected and utilized will be more fully disclosed below.

The operation of the pickup element 8 can be better understood by referring to FIG. 2. As may be seen in FIG. 2, the signals produced by the pickup element 8 is in the form of a correlogram with the signals shown as voltages, plotted in amplitude. The abscissas of the graph represent the degree of time coherence between the various signal components of the seismic signal and between the product of these signals that appear at various points throughout the system.

The original seismic wave is represented by the ordinate O. The ordinate $P_m$ represents the output voltage (calibrated in stress units) produced by the stress gage which is composed of the flexible diaphragm 11 and element 12, while the ordinate $V_m$ represents the output voltage calibrated in velocity units produced by the velocity or particle motion gage composed in part of arm 13 and device 14. These stress and velocity gages should be calibrated so that the electrical signals shown as the ordinates in FIG. 2 can be interpreted in terms of stress and particle velocity units if quantitative information is desired. Ordinate T (or power) represents the product produced by multiplying the stress and velocity outputs together, and $E_m$ represents the output obtained when the power signal represented by ordinate T is integrated.

As shown by FIG. 1, the seismic wave 2 will strike the pickup element 8 as the wave propagates in a downward direction. This will cause the pickup element to produce two signals 18 and 19. The signal 18 from the stress gage is caused by the stress force of the wave acting on the flexible diaphragm 11 and element 12 and will vary in amplitude in accordance with the pressure applied to the face of the diaphragm 11. The signal 19 represents the output signal from the motion or velocity gage. As the subterranean strata surrounding the pickup is moved or vibrated due to the passing of the seismic wave 2, the gage casing 8 will move with the medium, and the arm attached to mass 13 will move in and out of coil 14 to periodically increase and decrease the reluctance of coil 14. This is caused by the arm 13 tending to remain in its original position while the remainder of element 8 is moved (as is explainable according to the well known Newtonian laws of motion). This varying of the reluctance applied to the device 14 will cause a voltage to be produced by the motion or velocity portion of element 8. As can be seen, the outputs 18 and 19 are of substantially the same amplitude if interpreted in appropriate units and are always in phase. Thus, when the two signals are multiplied together, their product will be substantially as shown by portion 20 of the ordinate T. The integration of the signal 20 will produce an output signal 21 appearing on ordinate $E_m$.

When the portion 2 of the seismic wave strikes a decrease in acoustical impedances such as the air space or void 6, part of the original wave will be reflected back in the form of a reflected wave 7 (FIG. 1). This signal will strike the pickup element 8 propagating in an upward direction causing the element to produce the two signals 22 and 23, which are of much less amplitude than 18 or 19, however they are not so shown because of limited ordinate space on the figure. The first signal 22 is produced by the wave striking the diaphragm 11 in a manner substantially as described above in relation to the compression wave 2. As the upward propagating reflected wave strikes the element 8, the whole of the element 8 is subjected to motion as the particles surrounding the element are moved. The arm 13 will, however, tend to remain in its original position thus causing the reluctance applied to the motion responsive device 14 to vary according to the movement of the element 8. This variation in reluctance produces the signal 23. It should be noted that the signals 22 and 23 are now out of phase and the product of the signals when they are multiplied together will be substantially as shown by signal 24. The integrating of signal 24 produces an output as represented by signal 25. The fact that the signals 24 and 25 are negative indicates that the signals 22 and 23 are out of phase, and the associated energy is propagating in the opposite direction from that of 20 and 21.

The reason for the reversal of phase in the two signals 22 and 23 is from the physics of propagation. However, a somewhat simplified explanation of this reversal action will be presented and is substantially as follows. When the original wave 2 strikes the void or air space 6, there is a "spreading apart" of the medium particles during passage of the initial pulse of the wave. When the initial "spread apart" reflected wave 7 hits the element 8, the velocity gage will record a positive motion signal (in relation to the original downward compression wave propagation direction 2), or the medium particles will have a downward velocity while the stress gage will initially record a negative force signal 22 (in relation to this direction) since when the medium is sperad apart the stress or pressure will drop or go negative. In other words a positive stress pulse moving down (as in 2 of FIG. 1) must have downward particle velocity; and a negative stress pulse moving up (as in 7 of FIG. 1) must also have downward or positive particle velocity. Furthermore any wave pulse or train of waves (with positive and negative phases) that are traveling in the up direction must have their stress and velocity measurements continually out of phase if they are measured as in FIG. 1, with downward particle velocity defined as positive. Any waves of one or more cycles traveling or propagating downward must have the stress and velocity continually in phase with downward particle velocity defined as positive.

A portion 2' of the original compressional wave 2 passes through the area 6 and will continue travelling in a downward direction through the subterranean strata 4 until it strikes another change in acoustical impedance. The rock interface 16 represents such a change in impedance. This positive increase in impedance will cause a reflected wave 7' to be returned to the element 8. When the reflected wave 7' hits the element 8, the signals 26 and 27 are produced by the stress and velocity gages respectively. As can be seen, the two signals are out of phase and, when multiplied together, will produce the signal 28. Integration of signal 28 will produce the signal 29. Again, the negative sign of the signals 28 and 29 indicate that the signals 26 and 27, coming from the stress and velocity gages are out of phase. The initial positive stress and negative velocity shows that the reflection is caused by an increase in acoustic impedance.

The reason for this out of phase feature of the signals is that when the initial positive compression part of wave 2' hits an increase in acoustic impedance there will be a "compressing" of the particles taking place and a positive compressional pulse will be reflected. The reflected wave 7', which initially transmits this compressed particle action, will be picked up by the gages contained in element 8. The velocity gage will record a negative signal (in relationship to the original compression wave 2) at its output because the initial particle motion within the wave will be in a negative or up direction (in relationship to the original downward compression wave travel direction 2). The stress gage will record a positive output because there is a positive pressure exerted thereon due to the compressing effect of the particles surrounding the element 8; 53 and 54 of FIG. 2 is random noise traveling in various directions, and their stress and velocity is sometimes in and out of phase. The integral 56 of their product (55) being both positive and negative, cannot attain any appreciable value, but rather will fluctuate near zero as shown in 56.

The use of the two gages, each of which are responsive to a different parameter contained within the compression wave, permits the desired ratio of signal-to-noise to be greatly increased or, in other words, the useable and desired information contained within the final output signal will increase while the noise will decrease. This gain in the signal-to-noise ratio can best be seen in FIG. 2. The noise or undesired random signal detected by the stress gage is shown as 53 while the noise or undesired random signal detected by the velocity gage is shown as curve 54. When the two noise parameters are multiplied together they will appear as curve 55 and when this parameter product 55 is integrated, a curve 56 will result. It can readily be seen that the final integrated noise energy 56 is much lower in amplitude than is the signal 21, 25, or 29. From this it can be seen that, unless the noise signals are coming from the same direction as the desired signal the noise energy will be greatly reduced in amplitude as compared with the desired signal energy. This increase of the relative integrated signal product over that of the noise becomes greater and greater as the signal train becomes longer and longer, or the number of cycles becomes greater and greater. Thus the signal-to-noise ratio can be increased greatly if one could use a generator to produce a long continuous many-cycled seismic signal. If the method is used to listen to a signal of long duration such as that from a submarine, the integration can likewise be extended in time to increase the signal-to-noise ratio to almost any amount, as long as all the noise is not coming from the same direction as the signal. The obvious advantages of such a gain in the signal-to-noise ratio is quite apparent. By use of this method of multiplying and integrating two different periodically re-occurring signal parameters, desired signals which are much lower in amplitude than the surrounding noise level may easily be detected.

The surface wave 3, which is inherently produced by source 1, will not unduly effect the system after integration because the stress and velocity gages are orientated to keep in phase only the vertically traveling compressional waves. The gages, however, could be oriented to keep a surface wave type (such as a Rayleigh Wave) in phase for detection since the motion for the different wave types are well known. Similarly a shear wave (body wave) could be detected by suitable gage orientation since it is known that a shear wave has its motion perpendicular to the direction of propagation.

Figure 3:
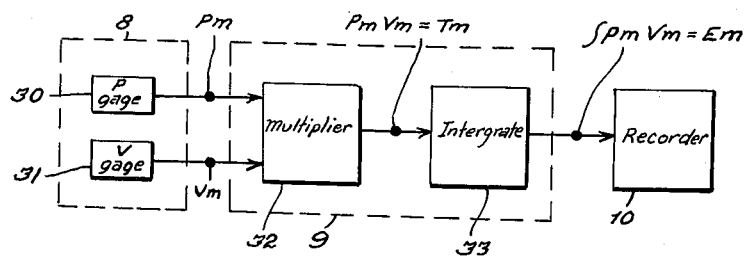
FIGURE 3 is a block diagram of the recording circuit of the surveying system for providing an increased signal-to-noise ratio.

In reference to FIG. 3, there is shown the apparatus of FIG. 1 in block form. The pickup element 8, consisting of the P or stress gage 30 and the V or particle velocity gage 31, is connected to circuit 9 by appropriate electrical conductor means. The circuit 9 consists of a multiplying circuit 32 and an integrator circuit 33 connected thereto.

The measured force, $P_m$ of the stress gage 30 and the motion $V_m$ of the velocity gage 31 are multiplied together in circuit 32. The product $P_m V_m$ ($T_m$) is then integrated by circuit 33 to give the energy measured $E_m$. The output of the circuit 9 is, in turn, connected to a suitable recorder device 10.

Figure 4:
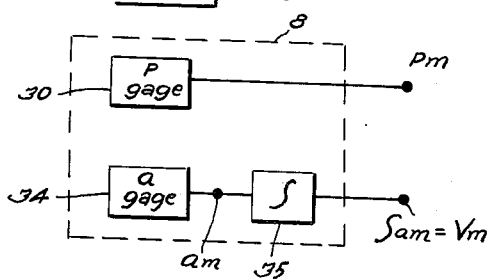
FIGURE 4 is a block diagram showing an accelerometer used as one of the gauges of the pickup element.

FIGURE 4 teaches one modification that can be made in the pickup element 8. In this modification, an accelerometer gage 34 is used in place of the velocity gage 31. The use of such an accelerometer requires that the measured output signal $a_m$ be converted into velocity. This can easily be done by use of well known relationship existing between acceleration and velocity which is:

Wherein: $$dv/dt = a$$

$dv$ = an incremental change in velocity,
$dt$ = an incremental change in time, and
$a$ = acceleration.

From this formula, it is readily seen that:
$$dv = adt$$
and that by integrating:
$$\int dv = \int adt$$
$$V = \int adt$$

For certain problems, such as for example, the determination of reflection coefficients or the recording of a signal coming from deep in the earth that is unaffected by the surface, it is desirable to know the amount of original energy contained within an acoustic or seismic wave if this wave was unaffected by any discontinuities at or ahead of the measuring position. In other words it may be desirable to measure the energy of waves traveling in a chosen direction after all the energy propagating opposite to the chosen direction has been removed. Such a determination in many cases may provide the best method to increase the signal-to-noise ratio, if the chosen direction is the same direction in which the signal is known to be traveling.

Also it may be desired to determine whether the impedance is increasing or decreasing.

FIGURES 5 and 6 show a system by which this original energy $E_o$ contained within a given wave may be obtained. The principle upon which the system shown in FIG. 6 works may best be explained by first referring to FIG. 5.

The stress and velocity gages of the pickup element 8 will receive and reproduce the time history of the signal parameters contained in the compression wave when it strikes the element. Before the recorded stress and velocity forces may be used to obtain the original wave energy from the disturbance causing the compression wave measured, the density of the medium through which the wave is traveling and the propagation velocity of the medium must be considered at the measuring position, the density constant of the medium is represented by the Greek letter $\rho$ while the propagation velocity constant is represented by $C$. To compensate for the difference in the signal units $V_m$ and $P_m$, $V_m$ is multiplied by the density and propagation velocity constants and may be represented as:

$$V_m \rho C$$

When the two signals $P_m$ and $V_m \rho C$ are superimposed one upon the other the individual signals will look substantially as shown in FIG. 5. If no energy was propagating in the opposite direction to the chosen direction as measured in FIG. 5, then $P_m$ and $V_m \rho C$ would fall on top of one another as predicted by the equation of motion for a plane elastic wave, namely $P = \rho C V$. In FIG. 5 the stress signal $P_m$ is shown as greater in amplitude than the velocity signal $V_m \rho C$ but the reverse could be true under certain conditions. The value for stress $P_o$ and the velocity term $V_o \rho C$ defined as if no returning energy were present, (to reduce the measured signal) may be obtained by dividing the sum of $P_m + V_m \rho C$ by two (2). Once $P_o$ is known, the original velocity vector $V_o$ is obtained by dividing $P_o$ by $\rho C$. With $P_o$ multiplied by $V_o$, the original power $T_o$ contained in both the $P_m$ and $V_m \rho C$ signals are given by the $P_o V_o$ power curve. The energy of the original signals $E_o$ may now be obtained by integration since it is well known that by integrating a power curve, an energy curve is obtained.

Referring back temporarily to the comparison of $P_m$ and $V_m \rho C$ mentioned above, if $P_m$ is greater than $\rho V_m C$, the reflected energy is coming from an effective increase in acoustic impedance; if $P_m$ is smaller than $\rho V_m C$, the effective change in this impedance is decreasing. There are many applications associated with the determination of the nature of the reflector where the relative value of $P_m$ and $\rho C V_m$ can be useful when measured at various positions and for various frequencies at any one position. For example, reflection coefficients discussed below are a function of this ratio.

In FIG. 6, a circuit for obtaining the original energy $E_o$ is shown. In this figure the velocity gage 31 is connected directly to a multiplier circuit 36. Also connected to the multiplier circuit is a constant voltage source 37, which may be varied as represented by the variable resistor 38. The signal $V_m$ is multiplied by $\rho C$ in the circuit 36 and the product $V_m \rho C$ is applied to an adder circuit 39. Also applied to the adder circuit 39 is the output $P_m$ from the stress gage 30. The sum of the two inputs that appear at the output of the adder are applied to a divider circuit 40, and by dividing the output of the adder circuit 39 by two, the stress vector $P_o$ is obtained. The stress vector $P_o$ is applied to a second divider circuit 41 in which the denominator of the divider circuit 41 is taken from the circuit 37 through a suitable electrical conductor and dividing $P_o$ by $\rho C$, the original velocity vector $V_o$ is obtained. The vectors $P_o$ and $V_o$ are multiplied together in the multiplier circuit 42. The product $P_o$ and $V_o$ are multiplied together in the multiplier circuit 42. The product $P_o V_o$ or power ($T_o$) is integrated by the circuit 43 to obtain the original energy $E_o$ which represents the energy devoid of any energy from waves propagating opposite to the original direction. From this it can readily be seen that the power or energy of a wave traveling in any direction, can be determined even though this measured energy is reduced to $E_m$ by oppositely traveling or reflected energy. We have defined such energy as the original energy $E_o$. This $E_o$ can be determined without any additional knowledge other than that received by the element 8 and the constants represented by the output of the circuit 37.

Under certain occasions, it is desirable to know the amount of reflected energy that is present. This reflected (or oppositely traveling) energy $E_r$ may be found by subtracting the measured energy $E_m$ from the original energy $E_o$. FIGURE 7 is directed to a system that will obtain this reflected energy. It can readily be seen that the system of FIGURE 7 is obtained by combining the circuits taught in FIGURES 3 and 6, respectively. To avoid the use of two integrator circuits, the power products $P_m V_m$ or ($T_m$) and $P_o V_o$ or ($T_o$) were subtracted from one another by circuit 44 to get $P_r V_r$ or ($T_r$), which is the power curve of the reflected signal. This difference ($T_r$) is then integrated to obtain the energy portion of the reflected signal $E_r$. The reflected energy $E_r$ may then be recorded on a recording device 10 is desired.

If it is desired to determine the amount of energy transmitted through any discontinuity, this transmitted energy will be represented by $E_m$ as determined in FIGURE 4, and which also represents the measured energy.

In surveying work, it is often desirable to know what type of discontinuity or material or medium the compression wave is passing through. The type of discontinuity combination or material or medium can often be identified if it can be determined how much of the signal or compression wave is transmitted and how much is reflected back to the pickup element. The ratio $E_r/E_o$ is called the reflection coefficient and a system for such a ratio if shown in FIGURE 8. The term discontinuity combination was used above since in seismic subsurface mapping, a simple discontinuity is rarely encountered. The reflection coefficient can be mapped for a complicated discontinuity in the same manner as done for a simple discontinuity or impedance change.

It is readily seen that the system shown in FIG. 8 is substantially that of FIG. 7 with certain additional circuits added. To obtain the denominator which is the original energy $E_o$, of the reflection coefficient, it is necessary to integrate the power curve $P_o V_o$ by the use of an integrator circuit 45. In order to compensate for the inherent difference in the arrival time of the signals $E_r$ and $E_o$, a variable delay circuit 46 is used. The signal $E_r$ is divided by the signal $E_o$ in the divider circuit 47 with the reflection coefficient being recorded on device 10. If only the ratio of the reflected power to original power $P_r V_r / P_o V_o$ is desired, the two integrating circuits 43 and 45 may be omitted since they are used only to convert the power units to energy units.

In FIG. 9 there is shown a system in which a plurality of pickup elements 8 are connected together in order to obtain a better signal-to-noise ratio. Each recording circuit may be not only provided with the circuits 9 but also unwanted component eliminator 48, such as a filter, if desired. The output from circuit 48 is fed to a delay circuit 49 which serves to match up occurrence in the multiplier circuits of the recorded signals from the elements 8. By the use of this type system, the signals received by the gages are multiplied together thereby giving a much stronger final output signal than otherwise obtainable. A plurality of recorders are shown but it is obvious that all of these except the last one, may be eliminated if desired.

It should be noted that the delay unit 49 may be omitted if energy only is to be measured. This is possible since the integrated energy signal will "stay up" during a reading where as a power signal will appear in the form of a "burst signal" and all such burst signals must occur at the output at the same time for an increase in the signal strength to occur at the output.

A system for increasing the signal-to-noise ratio by using the reflection coming back from the earth's surface is shown in FIGS. 10 and 11. In FIG. 10 it is seen that the original compression wave 2 will strike the rock interface 16 and be reflected back to the pickup element 8 in the manner described in FIG. 1. However, in the case of FIG. 10, the pickup element 8 is located far enough under the earth's surface 5 so that the original reflected wave 7' will strike the surface and be reflected back downward to the pickup element 8 as a second reflected wave 7''. By locating the element 8 under the surface a given distance, the wave 7'' will begin to strike the pickup after the trailing edge of the wave 7' has passed.

This system allows a much stronger signal to be applied to a recording unit, in the manner indicated below.

The circuit involved in using the double reflection method of recording is shown in FIG. 11. The pickup element 8 is connected to the amplifier 32 of unit 9 substantially as described in relation to FIG. 3. The multiplied output of the unit 32 is connected to a switch unit 50 which is so constructed that the first signal $P_m V_m$ caused by the reflected wave 7' will be connected through a delay unit 51. The delay unit serves to hold the signal $P_m V_m$ until the like part of the second reflected signal $P'_m V'_m$ caused by the reflected signal 7'' is received at the input of the switch 50. When the initial part of the second signal is received, the switch will operate to connect the signal directly to the multiplier unit 52 where the two power signals $P_m V_m$ and $P'_m V'_m$ will be multiplied together. The product of these two signals is then integrated by the unit 52 and recorded on the recorder 10. By using such a method, four vector quantities that are all in continuous phase are multiplied together, while the noise in these four vectors is less apt to be constantly in phase (than with two vectors). The integral of these four vectors multiplied in phase could greatly increase the signal-to-noise ratio.

The use of sinusoidal waves of any desired frequency when integrated by the phase method can provide a powerful tool in such surveying methods as seismic exploration, as will be indicated below. Powerful vibrators are available to generate waves of any desired frequency, and transfer function analyzers are available to separate out all but the pure sinusoidal part of the wave. For example, if a phase method technique using pure sine waves can be given, a method of experimentally plotting reflection coefficient versus frequency is accordingly made available. The use of reflection coefficient versus frequency curves are needed in basic studies as well as in the very practical study of locating stratographic oil traps, through the use of the reflection co-efficient versus frequency signature.

Furthermore, if a vibrator, that can generate various frequency signals, is available, the phase analysis of sinusoidal waves to be described, will provide a method and system to find the best frequency to yield maximum reflected energy in the mapping of a discontinuity. From the basic physics about the phase relationship between stress and particle velocity for propagating waves in the plus and minus direction, and from the equations of motion for a plane elastic propagating wave; the following two general wave equations for stress and velocity may be written, when only sinusoidal motion of a single frequency is involved. The first of these equations, the equation for stress may be written as.

(1) $\quad P = A \cos k(ct-x) + FA \cos k(ct+x)$ in which $A \cos k(ct-x)$ = the stress at $x$ propagating in the $x$ (or downward) direction.
$F$ = the fraction of the original peak amplitude A propagating in the minus $x$ direction.
$A$ = the peak amplitude propagating in the $x$ direction.
$FA \cos k(ct+x)$ = the stress at $x$ propagating only in the minus $x$ direction.
$k = 2\pi/\lambda$
$\lambda$ = wave length or distance between two successive maxima.

Or, from Equation 1 the stress force P may be written:

(2) $$P = A(1-F) \sin kx \left(\frac{1+F}{1-F} \cot kx \cos kct + \sin kct\right)$$

Assuming that by definition $$\cot \alpha = \frac{1+F}{1-F} \cot kx$$

or $\alpha$ is a function of $x$, then the Equation 2 may be written:

(3) $$P = \frac{A(1-F) \sin kx}{\sin \alpha} (\cos \alpha \cos kct + \sin \alpha \sin kct)$$

simplifing Equation 3, we have:

(4) $$P = \frac{A(1-F) \sin kx}{\sin \alpha} \cos (kct - \alpha)$$

The particle velocity relationship may be written as:

(5) $\quad \rho CV = A \cos k(ct-x) - FA \cos k(ct+x)$

In which again:

$A$ = the peak amplitude propagating in the $x$ direction.
$A \cos k(ct-x)$ = the particle velocity at $x$ multiplied by $\rho C$ propagating in the $x$ (or downward) direction, which, according to the equation of motion ($P = \rho CV$) for a plane elastic wave, is equivalent to the stress traveling in the same direction.
$F$ = the fraction of the original peak amplitude A propagating in the minus $x$ direction.
$FA \cos k(ct+x)$ = the particle velocity at $x$ multiplied by $\rho C$ propagating only in the minus $x$ direction.

The fact that the total reflected velocity is negative is due to the shift in phase caused by the reflection. Equation 5 may be rewritten as:

(6) $\quad \rho CV = A[\cos kct \cos kx + \sin kct \sin kx$
$\quad\quad\quad\quad\quad\quad -F(\cos kct \cos kx - \sin kct \sin kx)]$ simplifying, we have;

(7) $\quad \rho CV = A[\cos kct \cos kx (1-F)$
$\quad\quad\quad\quad\quad\quad\quad + \sin kct \sin kx (1+F)]$ (8) $$\rho CV = A \sin kx (1+F) \left[\cot kx \frac{1-F}{1+F} \cos kct + \sin kct\right]$$

assuming that by definition $$\cot B = \frac{1-F}{1+F} \cot kx$$

or B is a function of X, then the Equation 8 may be written as;

(9) $$\rho CV = \frac{A(1+F) \sin kx}{\sin B} \cos (kct - B)$$

Now by dividing the above definition for cot B by same for cot α (given in Equations 14 and 15 below); we will have;

(10) $$\frac{\cot B}{\cot \alpha} = \left(\frac{1-F}{1+F^2}\right)$$

It can thus be seen that from Equations 4 and 9 that the resultant or measured stress and velocity as measured at any value of $x$ in the $x$ direction resulting from sinusoidal waves of one frequency traveling in the plus and minus $x$ directions, is also a sinusoidal wave with the velocity signal lagging the stress signal by $B-\alpha$ (or $\phi$) and with maximum value (P max) as indicated by $$\frac{A(1-F) \sin kx}{\sin \alpha}$$

for stress and by $$\frac{A(1+F) \sin kx}{\sin B}$$

($\rho CV_{max}$) for velocity. Both α and B are seen to be functions of $x$.

Thus if the propagating waves can be considered sinusoidal, with all the waves having the same frequency, the wave or waves propagating in a certain direction can be separated from the wave or waves propagating in the opposite direction by an alternative method that also uses measurements of stress and velocity taken at one or more positions. The waves traveling in the two opposite directions can be separated by using the following three measurements taken of the resultant (or measured) wave traveling in the original (or chosen $x$) direction:

$P_{max}$ or the maximum stress value received,
$V_{max}$ or the maximum velocity value received, and
$\phi$ which is the angle that V lags behind P.

In arriving at these relations, the mechanical impedance Z can be defined as the ratio of $P_{max}$ over $V_{max}$.

By further simplifying the formula; $Z=P_{max}/V_{max}$ it can be shown that $Z/\rho C=1$ when both P and V are in the correct units as equated through the plane wave equations of equilibrium ($P=\rho CV$). Then it can be seen that $Z/\rho C=1$ for plane waves traveling in only one direction, and of course, $\phi=0$. The use of this relation $Z=\rho C$, for energy traveling in but one direction before reflections or other returning energies have arrived, can be used to determine $\rho C$. For additional sinusoidal waves traveling opposite to the original direction, $Z/\rho C$ will not equal 1, and $\phi$ may not be zero. For example, suppose we are taking P and V measurements at various depths below the surface. Let the original direction, the $x$ direction, be vertically downward from the surface, so that increasing $x$ corresponds to increasing depth. The value of the three measurements ($P_{max}V_{max}$ and $\phi$) taken in the $x$ direction for any value of $x$, can be substituted into the following three equations (which are derived from the above definitions and Equations 1–10):

(11) $$\frac{P_{max}}{\rho CV_{max}} = \frac{Z}{\rho C} = \frac{1-F}{1+F}\frac{\sin B}{\sin \alpha}$$

(12) $$\phi = B - \alpha$$

(13) $$\frac{\cot B}{\cot \alpha} = \left(\frac{1-F^2}{1+F}\right)$$

By proper calculation, the value of α, B, and F, which are the only three unknowns in Equations 11–13, may be obtained. From definitions Equation 14 or 15 below, the value of $x$ for the measuring position can be calculated (which represents the vertical distance from below which one would find P and V in phase). The change in the value of $x$ from location to location for gages corrected to a constant depth can be used to determine the change in depth of the reflector from place to place, if the returning energy is coming from essentially one reflector.

(14) $$\cot B = \frac{1-F}{1+F} \cot kx$$

(15) $$\cot \alpha = \frac{1+F}{1-F} \cot kx$$

From Equations 16 and 17 below, the value of A can be calculated.

(16) $$P_{max.} = \frac{A(1-F) \sin kx}{\sin \alpha}$$

(17) $$\rho CV_{max.} = \frac{A(1+F) \sin kx}{\sin B}$$

Then, from Equations 1 and 5 it can be seen that the stress $P_o$ and particle velocity $V_o$ (measured at $x$) of the wave traveling vertically downward in the plus $x$ direction can be given by Equations 18 and 19 below. This energy represents original energy (or only downwardly propagating energy) before effected by reflections or return energy.

(18) $$P_o = A \cos k (ct-x)$$

(19) $$\rho CV_o = A \cos k (ct-x)$$

The stress $P_r$ and particle velocity $V_r$ (measured at $x$) of the wave or waves traveling in the opposite (or upward directed) or in the minus $x$ direction can be given by Equations 20 and 21 below.

(20) $$P_r = FA \cos k (ct+x)$$

(21) $$\rho CV_r = -FA \cos k (ct+x)$$

The resultant values $P_m$ and $\rho CV_m$ for a wave traveling in both directions as measured in the $x$ direction would of course be as given above in Equations 1 and 5, or in Equations 4 and 9. Also for sinusoidal single frequency waves as indicated above, average power and thus energy can be calculated using Equations 22, 23, or 24 below depending on the propagating direction desired. Thus, the average resultant power in the $x$ direction (as measured) would be

(22) $$T_m = \frac{P_{max.}V_{max.}}{2} \cos \phi$$

The average power traveling only in the plus $x$ direction would be given by:

(23) $$T_o = \frac{A^2}{2\rho C}$$

The average power traveling only in the minus $x$ direction given by:

(24) $$T_r = \frac{(FA)^2}{2\rho C}$$

If desired, all of the three above average power curves can be integrated over time to give a corresponding energy curve. This is done merely by multiplying the average power by the time. As previously pointed out, $T_m$ and $E_m$ can be considered the transmitted average power or energy through a discontinuity, if a discontinuity is present.

The value and use of the above means system becomes readily apparent when it is realized that the measurements of $\phi$, $P_{max}$ and $V_{max}$ may be obtained with a high degree of accuracy. This extreme accuracy can be obtained if a generator used in producing the sinusoidal waves will operate for an extended period of time such as is possible with presently existing mechanical vibrators. Such a vibrator which will produce a seismic wave of long wave train duration, will allow the averages $\phi$, $P_{max}$ and $V_{max}$ to be used, thus giving an output signal which is very slightly affected by noise or other related errors. The use of such a vibrator will permit it to be run long enough for the accuracy needed. Also the value as calculated for A and F can be average for a number of depths if no reflector is located between the measurements, and if the measuring positions are not so far apart so that attenuation must be accounted for. Of course, an available transfer function analyzer or filter, that separates out all but the desired pure sinusoidal part of the wave, would be advantageously used before the wave train is analyzed as in FIG. 12 described below.

In reference to FIG. 12, there is shown a system in which $P_{max}$, $V_{max}$ and the phase $\phi$ is used. The pickup element is connected through suitable electrical conductor means to a first averaging circuit 57 and second averaging circuit 58 which are used to obtain a higher degree of accuracy since a temporary error will be overcome by the remaining signals used to obtain the average maximum signal. The average maximum signals $P_{max}$ and $V_{max}$ are then fed into a phase circuit 59 which detects the phase difference $\phi$ between the signals $P_{max}$ and $V_{max}$. The outputs from the circuits 57 and 58 are also connected to a combined multiplier and divider circuit 60. The phase difference $\phi$ is also connected to the circuit 60, so that the circuit performs the operation of solving the Equation 22 thereby giving the average resultant power $\overline{T}_m$. By integrating the power $\overline{T}_m$ in the circuit 61, first integrator, the energy $E_m$ is obtained. The signals $P_{max}$, $V_{max}$ and $\phi$ are also fed into a first electrical computer circuit 62 which is set up to solve the Equations 11, 12, and 13 for the values of $\alpha$, B, and F. The signals from this computer are applied to the input of a second electrical computer 63 which is set up to solve Equations 14 and 15 for the value of $x$. A third elctrical computer circuit 64 is used to solve the Equations 16 and 17 thereby giving the value of A. By applying the value of A to a first squaring circuit 65 and the output from this circuit to a third divider circuit 66, the original power $\overline{T}_o$ is obtained. Second integrator circuit (or multiplying circuit) 67 is used to convert the power signal $\overline{T}_o$ to the energy signal $E_o$. The signal A is also applied to a second squarer circuit 68 which also has connected thereto the signal F. The squared signals are applied to a fourth drivider circuit 69 so that Equation 24 is solved to give the average power $\overline{T}_r$ traveling only in the minus $x$ direction. A fourth electrical computer 71 is used to solve Equation 18 thereby giving the value $P_o$. Fifth electrical computer 72 solves Equation 20 for the value of $P_r$. By adding $P_o$ and $P_r$ together in first adder 76, the value of $P_m$ is obtained (see Equation 1). If both $P_o$ and $P_r$ are divided by $\rho C$ and $-\rho c$ in the first divider circuit 73 and second divider circuit 74, respectively, the signals $V_o$ and $+V_r$, respectively, are obtained. By adding the signals $V_o$ and $V_r$ together in the second adder circuit 75, the output signal $V_m$ is obtained (see Equation 5). The above values of $P_m$ and $V_m$ can be compared with the original measured P and V values put in to the analysis depicted in FIG. 12 to determine the error of the method. The outputs $E_m$, $P_m$, $V_m$, $E_o$, and $E_r$ are applied to a multichannel recorder 80.

The various computers shown in FIG. 12 could be replaced by the use of predetermined graphs or plots. These graphs could be worked out for various values in accordance with well known practices. For example, from Equations 11, 12, and 13 the inventor has plotted $Z/\rho C$ and F versus $\alpha$ for various values of $\phi$. Then from these two graphs, $Z/\rho C$ was plotted versus F for various values of $\phi$. From this last graph, it is a simple matter to determine F for any values of Z and $\phi$ that are measured. Since F is the fraction of the original amplitude that is returned, $F^2$ can be used as the reflection coefficient.

It should be noted that if the acoustic wave was not a sinusoidal wave, the above described method and techniques could be used by first performing a frequency analysis on both the velocity and stress wave. The frequency analysis would give maximum or peak amplitude and phase versus frequency for both the stress and velocity. Thus, at each frequency, one would have velocity and stress amplitudes, and from this analysis, the various values of $\phi$ could be found from the stress and velocity phase difference at each frequency. From this it becomes obvious how the above techniques could be performed in exactly the same way at all the frequencies where amplitudes and phases could be measured through the frequency analysis method.

If it is desired to determine the direction of compressional wave travel through the use of the phase method described, it is suggested that a three component accelerometer or velocity gage that is also capable of measuring pressure or stress be employed. The gage, if used in the medium so that it is coupled to move with the medium, can be used to determine the travel direction by the following phase technique. The dynamic pressure in the medium can be assumed to be equal in all directions if the medium is a fluid with little shear strength. The three component gage mentioned above would allow the dynamic vector velocity component to be determined in any direction. Thus the vector PV or $\int PVdt$ could be determined in any direction. The direction in which PV or $\int PVdt$ is a maximum gives the direction of travel of the compressional energy. A more accurate determination of propagation direction could be determined if the direction, in which the $P_oV_odt$ (see FIG. 6) is a maximum, is determined. The opposite direction would of course, give a negative value for PV or $\int PVdt$, $(P_oV_o$ or $\int P_oV_odt)$.

In the detection problem, it is not only helpful to determine the propagation direction of the initial motion of a signal, but also the polarity of this signal at various stations or quadrants. The above described means will give the directions, and the initial $P_o$ or $V_o$ will give the polarity (with little error due to noise) depending on whether their sign is positive or negative. Similar polarities in all quadrants from the source are used to differentiate an explosion from an earthquake the latter of which usually have dissimilar polarities in the various quadrants.

In most all of the above integrations, the differential and the limits of integration have been left out for the sake of simplicity. In all these cases, it should be understood that the differential and thus also the limits are in time. For example, to be correct $\int P_mV_m$ should be written as $\int_0^{t'} P_mV_mdt$ where $t$ is time, $t'$ is the time to which the integration is performed and $dt$ is the differential of time. In other words, time is the independent variable if not specified in the integration.

In order to ge the best efficiency from a generating source, one should vary the physical parameters (mass, force or contact points) of the source to minimize $T_r$, as determined in any of the figures showing $T_r$.

As stated above, the present methods and systems for surveying has been described in relationship to earth soundings but the methods and systems will work equally well (or better) where the compression waves are transmitted through a liquid or gaseous medium.

I claim:
1. An apparatus for increasing the signal to noise ratio in acoustic exploration systems comprising the combination of a stress gauge, a velocity gauge, a first and second multiplier and an adder each having a first and second input terminal, a first divider having one input terminal, a second divider having a first and second input terminal, a constant voltage source, an integrator having input and output terminals, and a recorder each having one input terminal; whereas; the output of said velocity gauge and the output of said constant voltage source being applied to the first and second input terminals of said first multiplier, respectively; the output of said first multiplier and the output of said stress gauge being applied to the first and second input terminals of said adder; respectively; the output of said adder being applied to said first divider; the output of said first divider and the output of said constant voltage source being applied to the first and second input terminals of said second divider, respectively; the output of said first divider and said second divider being applied to the first and second input terminals of said second multiplier, respectively; the output of said second multiplier being applied to the input terminal of said integrator; and the output of said integrator being applied to the input terminal of said recorder.

2. An apparatus for increasing the signal to noise ratio in acoustic exploration systems comprising the combination of a velocity gauge, a stress gauge, a first multiplier having one input terminal, a second and third multiplier each have a first and second input terminal, a constant voltage source, a first divider having one input terminal, a second divider an adder and a subtracter each having a first and second input terminal, an integrator and a recorder each having one input terminal; whereas; the output of said velocity gauge being applied to the input terminal of said first multiplier and to the first input terminal of said third multiplier; the output of said constant voltage source being applied to the second input terminal of said first multiplier and to the first input terminal of said second divider; the output of said stress gauge being applied to the second input terminal of said third multiplier and to the first input terminal of said adder; the output of said first multiplier being applied to the second input terminal of said adder; the output of said adder is applied to the input terminal of said first divider; the output of said first divider being applied to the second input terminal of said second divider and to the first input terminal of said second multiplier; the output of said second divider being applied to the second input terminal of said second multiplier; the outputs of said second and third multipliers being applied to the first and second input terminals of said subtracter, respectively; the output of said subtracter being applied to the input terminal of said integrator; and the output of said integrator being applied to the input terminal of said recorder.

3. An apparatus for increasing the signal to noise ratio in acoustic survey systems and for determining the reflection coefficient of a propagating acoustic wave comprising the combination of: a velocity gauge; a stress gauge; a first multiplier having one input terminal; a second and third multiplier each having a first and second input terminal; a first divider having one input terminal; a second and third divider each having two input terminals; an adder having a first and second input terminal; a constant voltage source; a subtracter having a first and second input terminal; a first and second integrator each having one input terminal; a delay means and a recorder each having one input terminal; whereas; the output of said velocity gauge being applied to the input terminal of said first multiplier and to the first input terminal of said third multiplier; the output of said stress gauge being applied to the first input terminal of said adder and to the second input terminal of said third multiplier; the constant voltage source being applied to the second input terminal of said first multiplier and to the first input terminal of said second divider; the output of said first multiplier being applied to the second input terminal of said adder; the output of said adder being applied to the input terminal of said first divider; the output of said first divider being applied to the first input terminal of said second multiplier and to the second input terminal of said second divider; the output of said second divider being applied to the second input terminal of said second multiplier; the output of said second multiplier being applied to the input terminal of said first integrator and to the first input terminal of said subtractor; the output of said third multiplier being applied to the second input terminal of said subtracter; the output of said subtracter being applied to the input terminal of said second integrator; the output of said first integrator being applied to the input terminal of said delay means; the output of said delay means and second integrator being applied to the first and second input terminals of said third divider, respectively; the output of said third divider being applied to the input terminal of said recorder.

4. An apparatus for increasing the signal to noise ratio in acoustic survey systems in which the sinusoidal peak of the stress and particle velocity and the phase difference between the sinusoidal stress and particle velocity are utilized comprising the combination of: a velocity gauge; a stress gauge; a first and a second averaging circuit each having an input and output terminal; a phase circuit having two input terminals and an output terminal; a first electrical computer having three input and three output terminals; a second electrical computer having three input terminals and one output terminal; a third electrical computer having four input terminals and one output terminal; a fourth electrical computer having two input terminals and one output terminal; a fifth electrical computer having three input terminals and one output terminal; a first and second adder each having two input terminals and one output terminal; a first and second divider each having an input and output terminal; a multiplier-divider circuit having three input terminals and one output terminal; a first integrator having an input and output terminal; a first squarer having an input and output terminal; a second squarer having two input terminals and one output terminal; a third and fourth divider each having an input and output terminal; a second and third integrator each having an input and output terminal and multichannel recorder; whereas, the output of said pressure gauge being applied to the input terminal of said first averaging circuit; the output of said first averaging circuit being applied to the second input terminal of said phase circuit, the third input terminal of said first electrical computer and the first terminal of said multiplier-divider circuit; the output of said velocity gauge being applied to input terminal of said second averaging circuit; the output of said second averaging circuit being applied to the first input terminal of said phase circuit, the first input terminal of said first electrical computer and the second terminal input of the said multiplier-divider circuit; the output of said multiplier-divider circuit being appled to the input of said first integrator; the output of said first integrator being applied to a channel of said multichannel recorder; the output of said phase circuit being applied to the second input terminal of said first electrical computer and to the third input terminal of said multiplier-divider circuit; the output from the first output terminal of said first electrical computer being applied to the first input terminal of said second electrical computer, the first input terminal of said third electrical computer, the first input terminal of said fifth electrical computer and the first input terminal of said second squarer; the output from the second output terminal of said first electrical computer being applied to the second input terminal of said second electrical computer and the second input terminal of said third electrical computer; the output from the third terminal of said first electrical computer being applied to the third input terminal of said second electrical computer and the fourth input terminal of said third electrical computer; the output from the output terminal of said second electrical computer being applied to the third input terminal of said third electrical computer, the second input terminal of said fourth electrical computer and the third input terminal of said fifth electrical computer; the output from the output terminal of said third electrical computer being applied to the first input terminal of said fourth electrical computer, the second input terminal of said fifth electrical computer, the input terminal of said first squarer and the second input terminal of said second squarer; the output terminal of said fourth electrical computer being applied to the input terminal of said first divider and to the first input terminal of said first adder; the output of said fifth electrical computer being applied to input of said second divider and the second terminal of said first adder; the output of said first adder being applied to a channel of said multichannel recorder; the output of said first divider being applied to the first input terminal of said second adder; the output of said second divider being applied to second input terminal of said second adder; the output of said second adder being applied to a channel of said multichannel recorder; the output of said first squarer being applied to the input of said third divider; the output of said third divider being applied to the input of said second integrator and the output of said second integrator being applied to a channel of said multichannel recorder; the output of said second squarer being applied to the input of said fourth divider; the output of said fourth divider being applied to the input of said third integrator and the output of said third integrator being applied to a channel of the said multichannel recorder.

5. An apparatus for increasing the signal to noise ratio in acoustic explorations systems comprising the combination of: a plurality of at least three channels each including means responsive to seismic wave energy for producing stress and vector forces; the first of said channels consisting of means responsive to seismic wave energy comprising a velocity gauge and a stress gauge, an unwanted components eliminator provided with an input terminal and an output terminal, said means responsive to seismic wave energy coupled through a multiplier and integrator to the input terminal of said unwanted component eliminator, and a delay means having an input terminal and two output terminals, the output terminal of said unwanted components eliminator being connected to the input terminal of said delay means; the second and third channels each including means comprising a velocity gauge and a stress gauge responsive to seismic wave energy for producing vector and stress forces, an unwanted components eliminator having an input and output terminal, the output of said gauges coupled through a multiplier and integrator to the input terminal of said unwanted components eliminator, a multiplier provided with two input and one output terminals, one input terminal of said multiplier coupled to the output terminal of said unwanted components eliminator, and a delay means provided with an input and two output terminals, the input terminal of said delay means coupled to the output terminal of said multiplier; one output terminal of the delay means of said first channel coupled to the other input terminal of the multiplier of said second channel; one output terminal of the delay means of said second channel coupled to the other input terminal of the multiplier of said third channel; and one output terminal of the delay means of said third channel coupled to a recording means.

References Cited by the Examiner
UNITED STATES PATENTS

| | | | |
|---|---|---|---|
| 2,740,945 | 4/1956 | Howes | 340—15.5 |
| 2,840,308 | 6/1958 | Van Horne | 235—181 |
| 2,923,367 | 2/1960 | Cox | 340—15.5 X |
| 2,989,726 | 6/1961 | Crawford et al. | |
| 3,015,086 | 12/1961 | Heintz | 340—15.5 |
| 3,023,966 | 3/1962 | Cox et al. | 235—181 |
| 3,063,034 | 11/1962 | Lee | 235—181 X |

MALCOLM A. MORRISON, *Primary Examiner.*

C. L. WHITHAM, T. KESCHNER, *Assistant Examiners.*